United States Patent [19]
Inubushi et al.

[11] Patent Number: 5,548,824
[45] Date of Patent: Aug. 20, 1996

[54] PORTABLE RADIO COMMUNICATION DEVICE HOUSING HAVING A BATTERY STORAGE UNIT

[75] Inventors: Toshiya Inubushi; Yoshio Toko; Atsushi Musha, all of Amagasaki, Japan

[73] Assignee: Mitsubishi Denki Kabushiki Kaisha, Tokyo, Japan

[21] Appl. No.: 292,775

[22] Filed: Aug. 18, 1994

[30] Foreign Application Priority Data

Aug. 25, 1993 [JP] Japan ................................. 5-210520

[51] Int. Cl.⁶ .................................................. H04B 1/38
[52] U.S. Cl. .............................. 455/90; 455/89; 455/128; 455/351; 379/433
[58] Field of Search .......................... 455/89, 90, 128, 455/351, 348, 349; 379/433, 434, 428

[56] References Cited

U.S. PATENT DOCUMENTS 4,845,772  7/1989  Metroka et al. ........................ 379/61
5,170,494  12/1992 Levanto ................................... 455/90
5,251,329  10/1993 Takagi et al. ............................ 455/89

FOREIGN PATENT DOCUMENTS

| 0530719 | 3/1993 | European Pat. Off. . |
| 1398570 | 6/1975 | United Kingdom . |
| 1407170 | 9/1975 | United Kingdom . |
| 2158328 | 11/1985 | United Kingdom . |

*Primary Examiner*—Reinhard J. Eisenzopf
*Assistant Examiner*—Gertrude Arthur
*Attorney, Agent, or Firm*—Rothwell, Figg, Ernst & Kurz

[57] ABSTRACT

A slim portable radio communication device housing that can be connected to an external input/output connector without removing a battery pack. A fitting mount of a battery pack is rotatably fitted to the radio communication device housing via shafts. The battery pack is detachably fitted to the fitting mount.

11 Claims, 12 Drawing Sheets

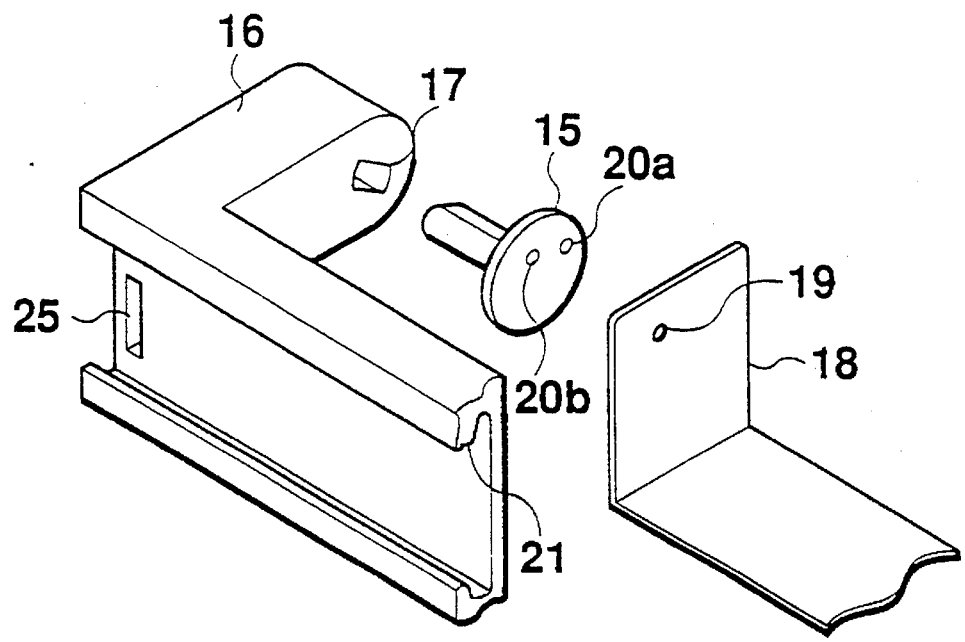
Fig. 8
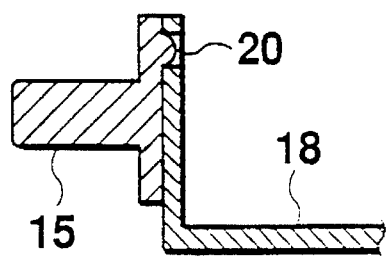
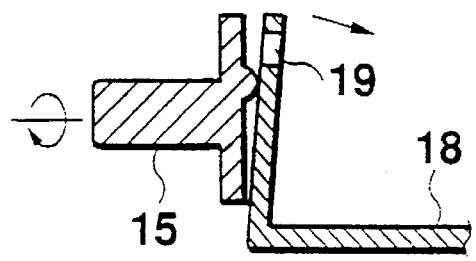
Fig. 9A Fig. 9B

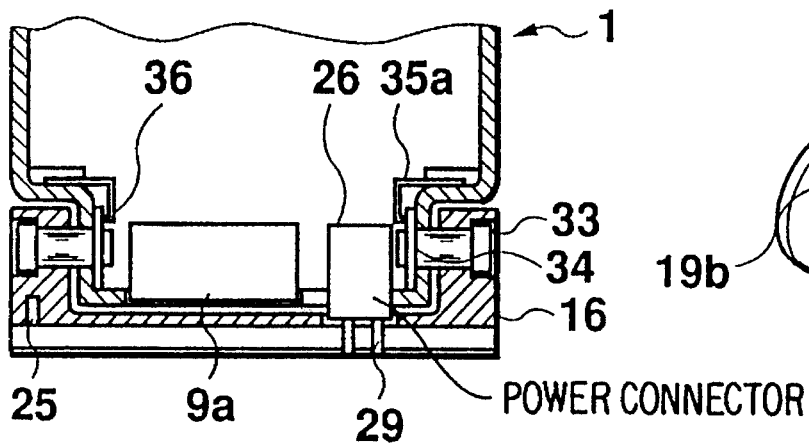
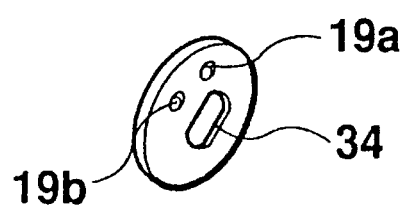
Fig. 12A          Fig. 12B
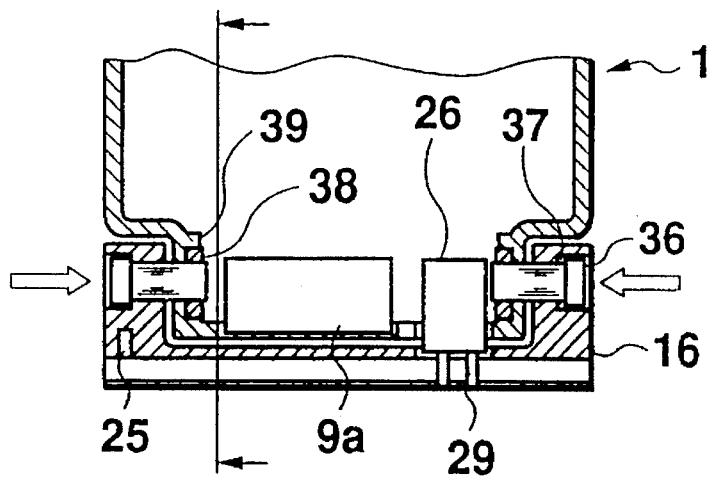
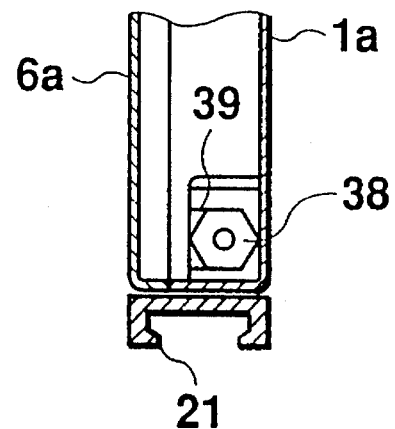
Fig. 13A          Fig. 13B

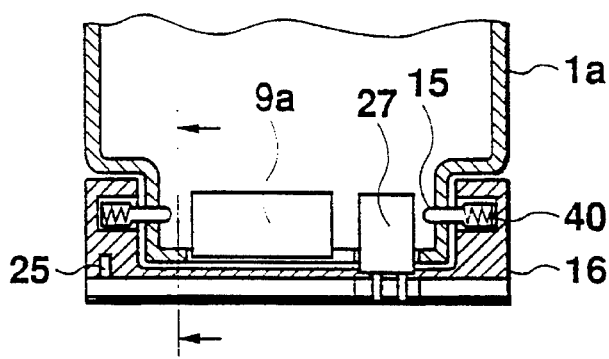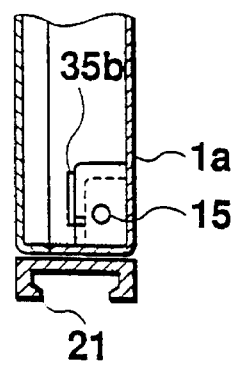
Fig. 14A  Fig. 14B
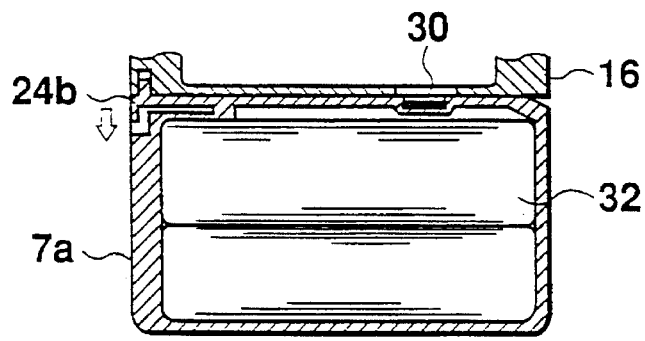
Fig. 15
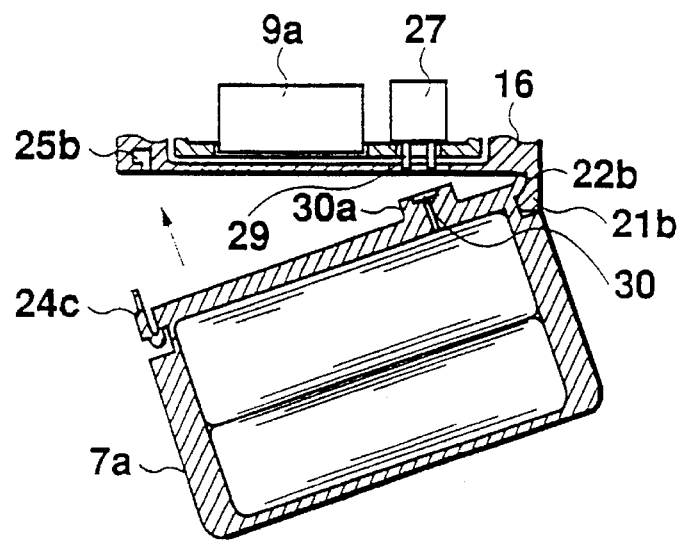
Fig. 16

PORTABLE RADIO COMMUNICATION DEVICE HOUSING HAVING A BATTERY STORAGE UNIT

BACKGROUND OF THE INVENTION

1. Field of the Invention

This invention relates to a housing of a portable radio communication device, such as a portable telephone.

2. Description of the Related Art

FIGS. 1 and 2 are perspective views showing conventional portable telephone housings, wherein a cover 1b or 1c has a loudspeaker hole 2, a microphone hole 3, a display window 4, and key buttons 5. A case 6b or 6c and the cover 1b or 1c make up the radio communication device housing. A battery pack 7b or 7c is fixed to the cover 1b or 1c. The cover 1 is equipped with a connector hole 8b and a receptacle 9b of an external power connector, which will hereinafter be referred to as an I/O connector. A plug 10 of the I/O connector, which is provided with a lock release button 11, is attached to one end of a cable 12.

A cigar lighter plug 13 shown in FIG. 3, which is attached to the other end of the cable 12, is a plug that can be fitted into a cigar lighter mounted on a car. A hands-free (H/F) adapter 14 shown in FIG. 4, which is attached to the other end of the cable 12, is an adapter for holding the portable radio communication device and containing a hand-free circuit.

Next, the operation will be described. First, as shown in FIGS. 1, 3, and 4, the portable telephone normally comprises the battery pack 7b for receiving a power supply from the battery cells. However, the battery cell capacity is finite, and for example, when the user uses the portable telephone in a car, he or she may want to receive a power supply from a car battery. To meet this requirement, the portable telephone needs to be equipped with the I/O connector receptacle 9b as shown in FIG. 1.

The cigar lighter adapter 13 is fitted into the cigar lighter section of the car and the I/O connector plug 10 is coupled with the I/O connector receptacle 9b, thereby receiving a power supply from the car battery. Since the I/O connector has a lock structure and the cable 12 is curled, the user can use the portable telephone like a normal home telephone or mobile phone, at a comparatively desirable use position. It is dangerous, when talking with the associated party, for the driver to hold the portable telephone while driving. Thus, the H/F adapter 14 shown in FIG. 4 is provided to enable the user to talk without holding a handset. With the H/F adapter 14, the user can talk with the portable telephone held on the H/F adapter 14.

Thus, the necessity of mounting the I/O connector receptacle 9b as well as the battery pack 7b is extremely high for the portable telephone. Further, user friendliness can be improved by adopting a structure for eliminating the need for unloading the battery pack 7b when the plug 10 of the I/O connector is fitted into the I/O connector receptacle 9b. Therefore, the I/O connector receptacle 9b is located on the bottom of the portable telephone and the battery pack 7b is disposed on the rear.

On the other hand, FIG. 2 shows an example of a portable telephone for which no I/O connector is provided. The battery pack 7 is disposed on the bottom of the portable telephone to make it slim.

Such a structure provides a slim portable telephone, but contains no I/O connector, thus power is only supplied from the battery pack 7. Therefore, a power supply from a car or the like as described above cannot be received.

Since the conventional portable radio communication device housings are formed as described above the thickness of the housing should be more than the total of the thickness of the key switch section and that of the housing, and, if the I/O connector receptacle 9b is disposed on the bottom of the portable telephone housing, the thickness of the battery pack. Therefore it is very difficult to make radio communication device slim. If the battery pack is located on the bottom of the radio communication device housing, no external unit connection connector (I/O connector) can be installed. Therefore, a power supply from the car or the like cannot be received although the housing can be made slim. On the other hand, if an I/O connector is installed, the I/O connector is not usually disposed on the battery pack. Therefore, if the battery pack is not removed, the connector cannot be used. When the battery pack is removed, the removed battery pack is inconvenient to handle.

SUMMARY OF THE INVENTION

It is therefore an object of the invention to provide a portable radio communication device having a slim portable radio communication device main unit to which a battery power supply is fitted for enabling the user to select the battery power supply or an external power supply for use as required.

To this end, according to the invention, there is provided a portable radio communication device having a portable radio communication device main unit comprising electronic equipment housed in a housing thereof and a battery storage unit fitted to the portable radio communication device main unit for supplying power thereto, the battery storage unit being rotatably the portable radio communication device main unit, the portable radio communication device main unit comprising a battery power connector section for receiving a power supply from a battery and an external power connector section for receiving a power supply from an external power source, located on the battery storage unit side of the main unit. When the battery storage unit is positioned at a predetermined battery connection position relative to the portable radio communication device main unit, the battery power connector section comes into contact with a fixed terminal of the battery storage unit, and the external power connector section can be exposed for connection to the external power source by rotating the battery storage unit a predetermined amount from the battery connection position towards the portable radio communication device main unit.

The structure enables the portable radio communication device to be formed as thin as the thickness of the battery storage unit, which is limited to the battery size. On the other hand, to use an external power supply, the user may expose the external power connector section for connection to the external power supply by rotating the battery storage unit. Therefore, the extremely simple structure enables the user to select the battery power or external power supply as appropriate.

The battery storage unit can have a fitting mount section being rotatably fitted to the portable radio communication device main unit, and a battery pack section being detachably fitted to the fitting mount section.

Further, the housing of the portable radio communication device main unit contains shafts functioning as rotating shafts and a plate spring for energizing the shafts from the inside of the housing to the outside, the shafts being fitted into the fitting mount so as to rotate together with the fitting mount, wherein a frictional contact portion at least one of the shafts with the plate spring is formed substantially like a disk and a predetermined number of dome shaped protrusions are formed on a surface of the frictional contact portion, the plate spring having a hole on at least one sides for engaging one of the dome shaped protrusions formed on the shafts, and wherein the position in a rotation direction of the fitting mount section with respect to the portable radio communication device main unit is determined by engaging one of the dome shaped protrusions of each of the shafts into each hole of the plate spring.

Therefore, the simple structure enables easy and automatic determination of the position in the rotation direction of the fitting mount with respect to the main unit of the portable radio communication device.

The fitting mount section is formed with the shafts being fitted into the portable radio communication device main unit so as rotate together with the fitting mount section, wherein a shaft slipping off prevention plate formed with a plurality of holes is fitted to an end of the shaft on the housing inside of the portable radio communication device main unit, wherein a spring having a claw engaging one of the holes formed on the shaft slipping off prevention plate is fixed inside the housing of the portable radio communication device main unit, and wherein the position in a rotation direction of the fitting mount section with respect to the portable radio communication device main unit is determined by engaging the claw of the spring into one of the holes of the shaft slipping off prevention plate.

Here, the fitting mount section is provided with shafts fitted into the main unit of the portable radio communication device. Therefore, the apparatus can be assembled by fitting the shafts from the housing outside of the main unit of the portable radio communication device, so that easy assembly and high workability are accomplished. The simple structure enables setting of the position in the rotating direction of the fitting mount.

The fitting mount section is formed with the shafts being fitted into the portable radio communication device main unit so as to rotate together with the fitting mount section, wherein a shaft rotation stopper formed as a polygon is fitted to an end of the shaft on the housing inside of the portable radio communication device main unit, and wherein receptacles, each engaging each of the shaft rotation stoppers, are provided within the housing for regulating rotation of the shaft rotation stoppers.

The battery pack section is provided with a lever for fixing a position, the lever being fitted into a recess formed in the fitting mount section for fixing the battery pack section to the fitting mount section.

The shaft rotation stoppers formed as polygons can prevent accidental rotation of the fitting mount because the fitting mount does not rotate unless the shaft rotation stoppers are removed from the recesses, whereby damage to the machine, etc., can be reduced.

The battery pack section is fitted to the fitting mount section for rotation, and a protrusion is formed on the fitting mount section side of the battery pack section, the protrusion being formed with a fixed terminal, the fixed terminal coming in contact with the battery power connector section when the battery pack section is fixed to the fitting mount section. Since the fixed terminal formed on the protrusion comes in contact with the battery power connector section, the protrusion dimension of the battery power connector section from the portable radio communication device main unit can be reduced and failure in the battery power connector section can also be reduced.

The shafts are attached to the fitting mount section via springs and are fitted from the fitting mount section to the inside of the portable radio communication device main unit. Therefore, the shafts are elastic for the fitting mount section, facilitating fitting of the fitting mount to the portable radio communication device main unit.

The portable radio communication device main unit comprises an elastic positioning terminal located on the battery storage unit side of the main unit, and a plurality of positioning recesses engaging the positioning terminal are formed in a portion of the battery storage unit facing the positioning terminal.

The battery storage unit is provided with the shafts fitted into the portable radio communication device main unit so as to rotate together with the battery storage unit, L-shaped members, and protrusions for moving the L-shaped members in a rotating shaft direction, the shafts each being attached to one end of each of the L-shaped members, the protrusions formed so as to protrude from the housing of the battery storage unit each being attached to another end of each of the L-shaped members, and a fitting state of the shafts and the portable radio communication device main unit is released by handling the protrusions for moving the L-shaped members in the rotating shaft direction. Thus, the battery storage unit itself can be detachably attached to the portable radio communication device main unit, whereby the number of parts of the apparatus can be reduced drastically.

According to the invention, there is provided a portable radio communication device having a portable radio communication device main unit comprising electronic equipment housed in a housing thereof and a battery storage unit fitted to the portable radio communication device main unit for supplying battery power thereto, the battery storage unit being fitted to the portable radio communication device main unit so as to rotate with rotating shafts, the portable radio communication device main unit comprising an external power connector section for receiving a power supply from an external power source, located on the battery storage unit side of the main unit, and battery power terminals coming into contact with the shafts when the shafts of the battery storage unit are fitted into the main unit, if being possible to expose the external power connector section for connection to the external power source by rotating the battery storage unit with respect to the portable radio communication device main unit, the battery storage unit being provided with the shafts electrically connected to the battery and fitted into the portable radio communication device main unit, L-shaped members each having one end attached to each of the shafts, and protrusions each being attached to another end of each of the L-shaped members for moving the L-shaped members in a rotating shaft direction, the portable radio communication device main unit being electrically connected to the battery via the battery power terminals and the shafts by fitting the shafts into the portable radio communication device main unit, a fitting state of the shafts and the portable radio communication device main unit and the electrical connection of the portable radio communication device main unit to the battery being released by handling the protrusions for moving the L-shaped members in the rotating shaft direction.

Thus, by electrically connecting the shafts to the battery, the shafts can be made to serve as the rotating shafts and battery power connector. This eliminates the need for providing any additional battery power connector, enabling further reduction of the number of parts of the apparatus,

BRIEF DESCRIPTION OF THE DRAWINGS

In the accompanying drawings:

FIG. 8 is an illustration showing the structure of a fitting mount 16 in FIG. 5;

FIG. 9A is a sectional view showing how a rotation lock mechanism works during rotation lock of the portable radio communication device housing according to the first embodiment of the invention;

FIG. 9B is a sectional view showing how a rotation lock mechanism works during rotation unlocking in the portable radio communication device housing according to the first embodiment of the invention;

FIG. 12A is a partial sectional view illustrating a rotation mechanism in a fitting mount portion of a portable radio communication device housing according to a second embodiment of the invention;

FIG. 12B is an illustration of the structure of a ring 34 in FIG. 12A;

FIG. 13A is a partial sectional view illustrating a rotation mechanism in a fitting mount portion of a portable radio communication device housing according to a third embodiment of the invention;

FIG. 13B is a partial sectional side view illustrating the rotation mechanism in the fitting mount portion of the portable radio communication device housing according to the third embodiment of the invention;

FIG. 14A is a partial sectional view illustrating a rotation mechanism in a fitting mount portion of a portable radio communication device housing according to a fourth embodiment of the invention;

FIG. 14B is a partial sectional side view illustrating the rotation mechanism in the fitting mount portion of the portable radio communication device housing according to the fourth embodiment of the invention;

FIG. 15 is a sectional view illustrating a fixing mechanism of a power pack of a portable radio communication device housing according to a fifth embodiment of the invention;

FIG. 16 is a sectional view illustrating a fixing mechanism of a power pack of a portable radio communication device housing according to a sixth embodiment of the invention;

DESCRIPTION OF THE PREFERRED EMBODIMENTS

Figure 1:
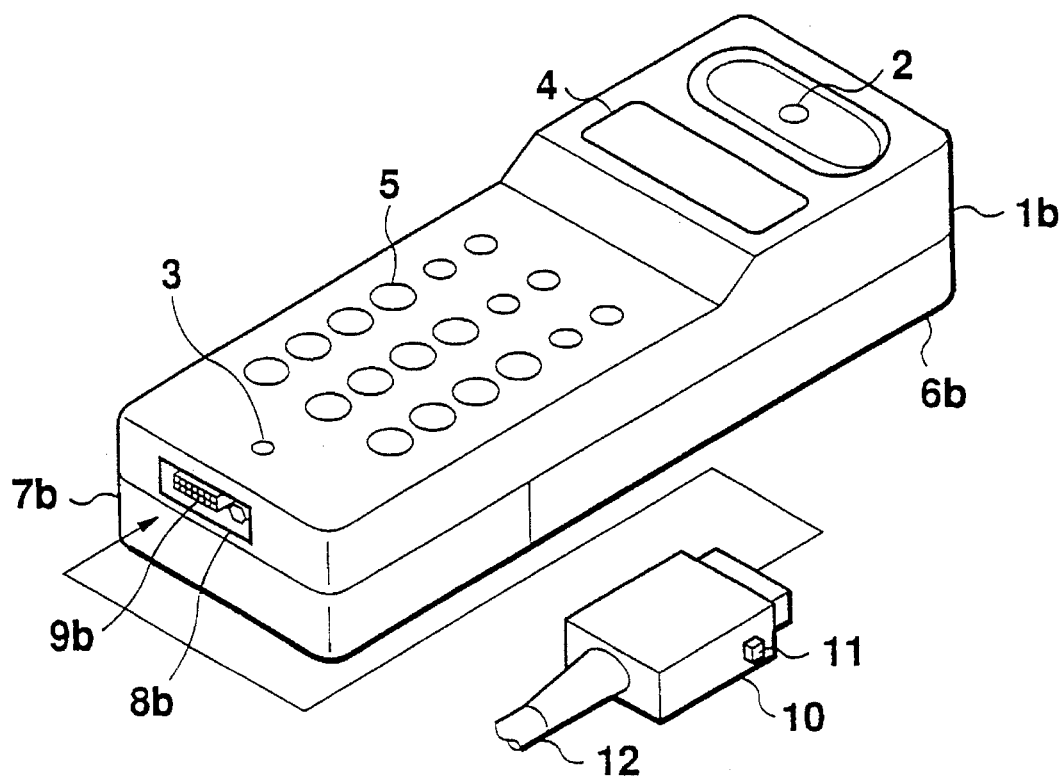
FIG. 1 is a schematic perspective view of a conventional portable radio communication device housing.
Figure 2:
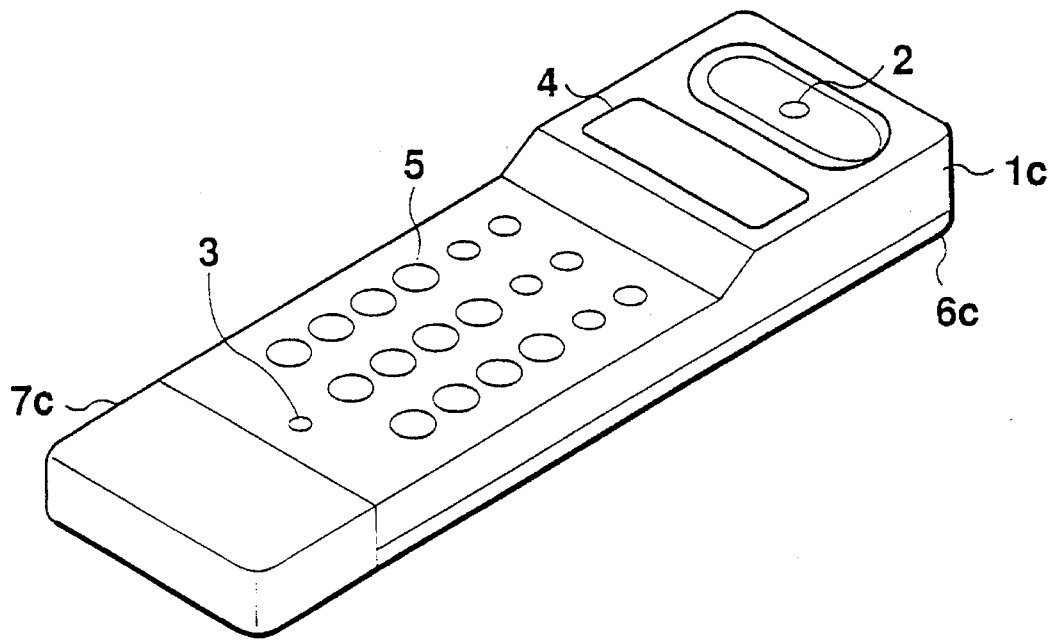
FIG. 2 is a schematic perspective view of a conventional portable radio communication device housing having a different structure from that in FIG. 1.
Figure 3:
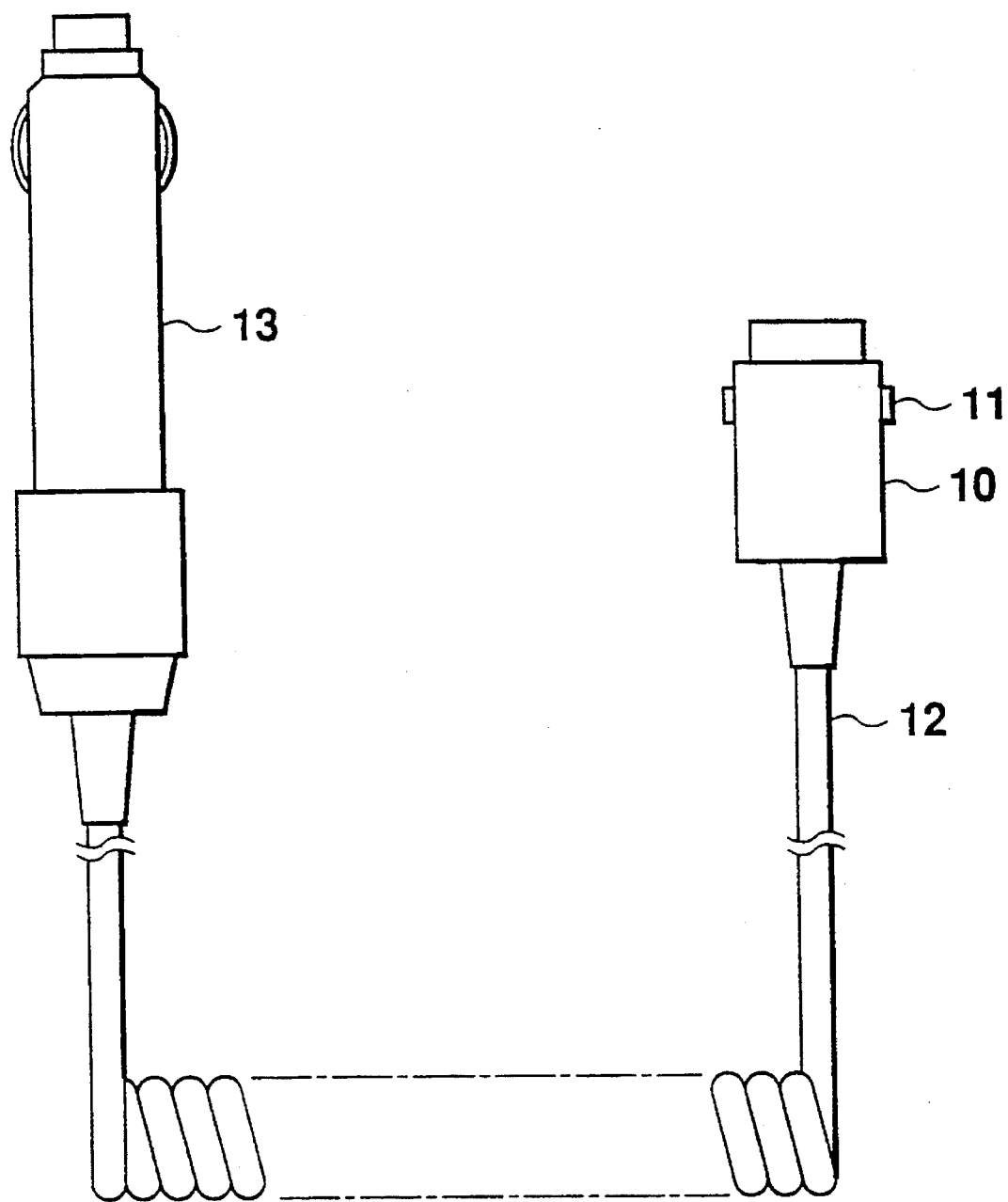
FIG. 3 is a schematic diagram of a cigar lighter adapter being connected to a portable radio communication device housing for supplying external power to the portable radio communication device.
Figures 4A, 4B:
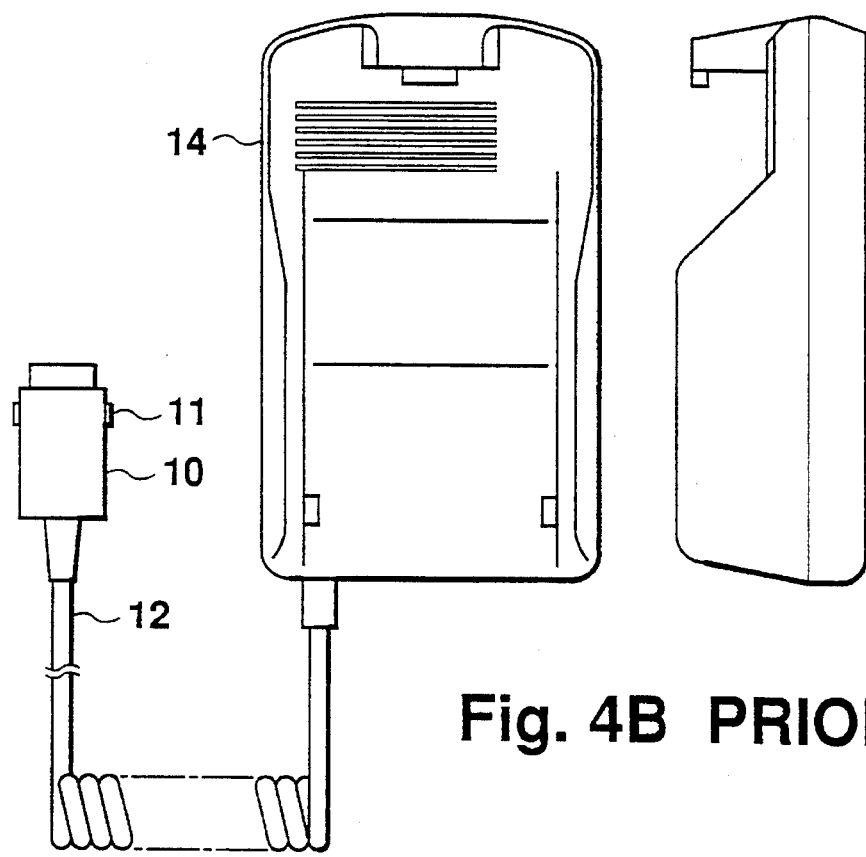
FIG. 4 is a schematic diagram of a hands-free adapter being connected to a portable radio communication device housing for supplying external power to the portable radio communication device.
Figure 5:
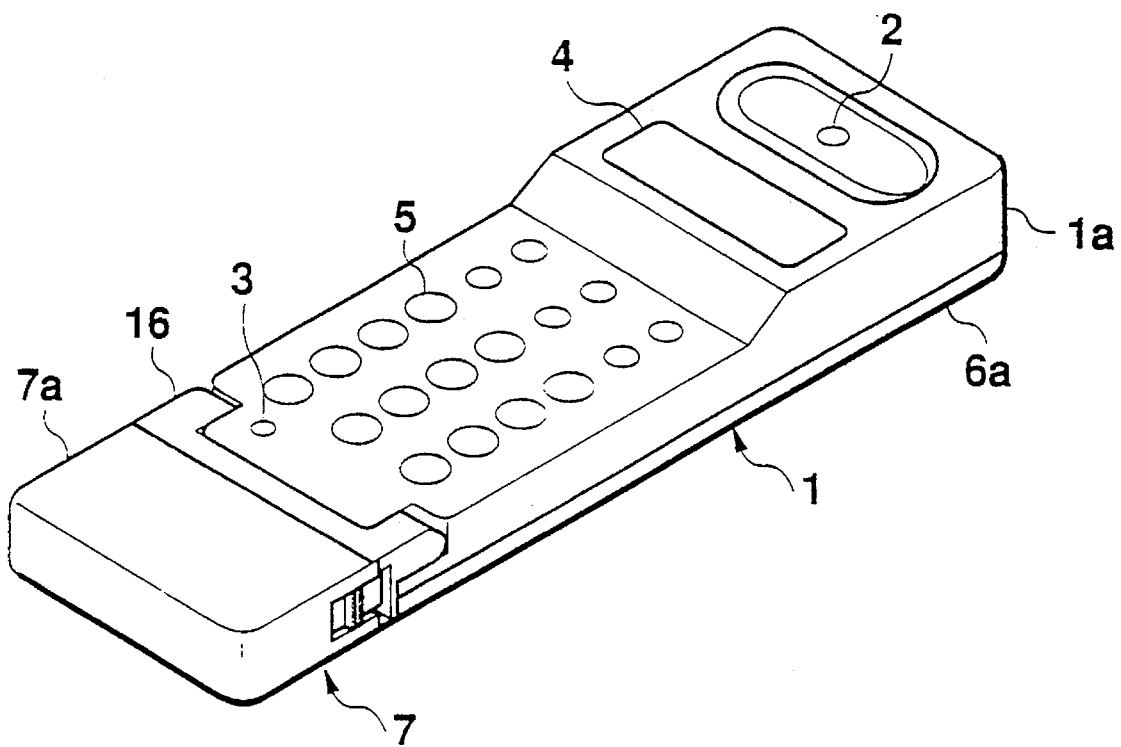
FIG. 5 is a schematic perspective view of a portable radio communication device housing according to a first embodiment of the invention.
Figure 6:
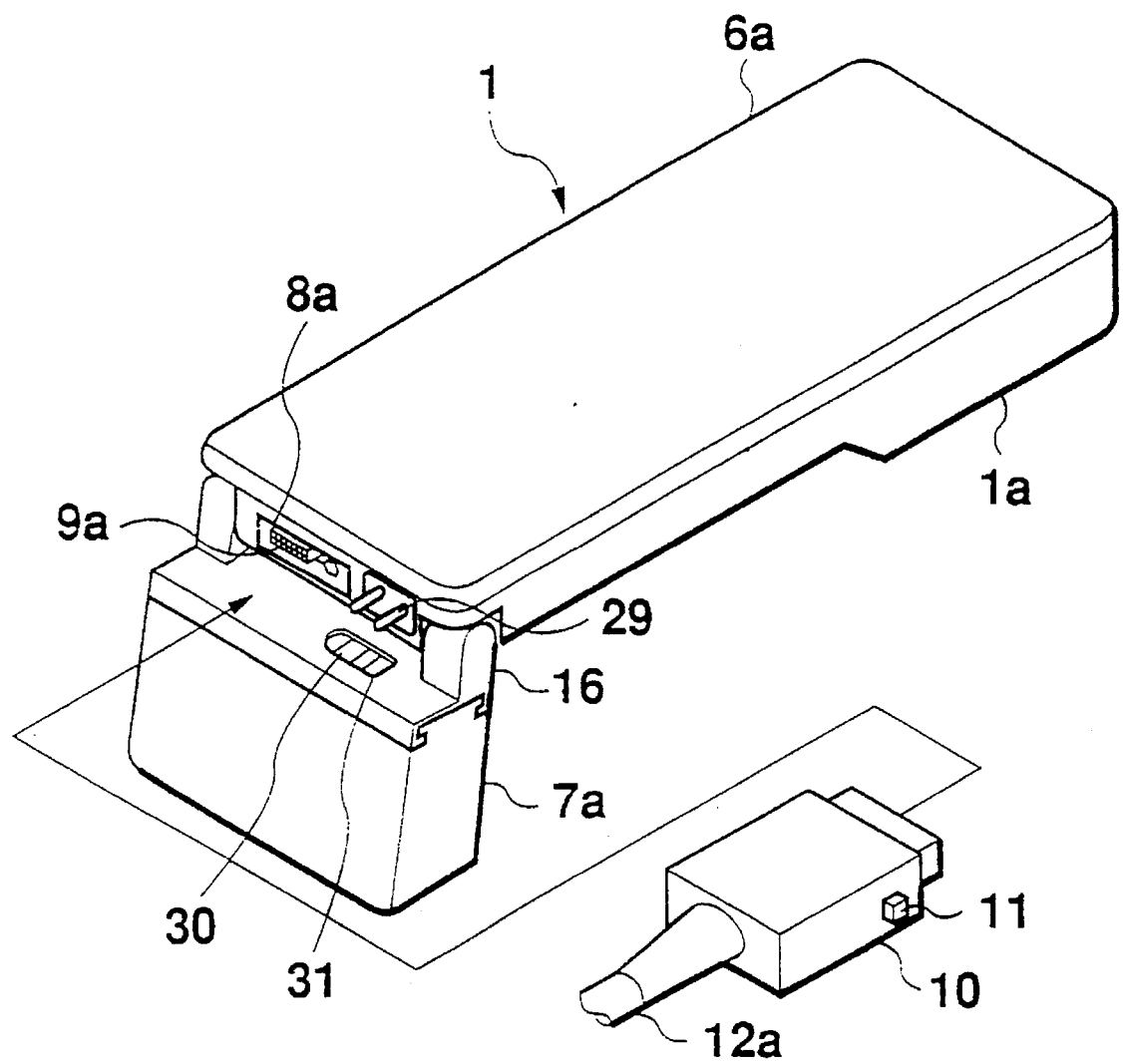
FIG. 6 is a rear perspective view of the portable radio communication device housing in FIG. 5.

Referring now to the accompanying drawings, there are shown preferred embodiments of the invention. Members identical with or similar to those previously described with reference to FIGS. 1 to 4 are denoted by the same reference numerals in the following figures and will not be discussed again.

EMBODIMENT 1

A radio communication device housing according to a first embodiment of the invention will be discussed with reference to FIGS. 5 to 11. A cover 1a of a main unit 1 has a pair of round holes on both sides of the bottom, and shafts 15 are threaded through from the inside of the holes (inside of the main unit 1) to the outside. As shown in FIG. 8, each of the shafts 15 has a section of its tip formed like a partially cut circle, and is fitted into a recess 17 made on a fitting mount 16. Like the shaft 15, the recess 17 is formed like a partially cut circle. Thus, the shafts 15 and the fitting mount 16 are rotated in the same fixed direction, thereby enabling the fitting mount 16 and the shafts 15 to be rotated with respect to the cover 1a.

As shown in FIGS. 7 and 8, the shafts 15 are pressed by means of a plate spring 18 from the inside of the cover 1a to prevent the shafts 15 from coming off the cover 1a. The plate spring 18 is formed with a round hole 19 on both sides. On the other hand, each of the shafts 15 is formed with dome shaped protrusions 20a and 20b engaging the round hole 19, as shown in FIGS. 8, 9A and 9B. The positional relationship between the round hole 19 and the dome shaped protrusions 20a and 20b is provided corresponding to the angle at which the fitting mount 16 is to be fixed. That is, the protrusion 20a is disposed at a position engaging the round hole 19 when a battery pack 7a is substantially aligned with the portable telephone main unit. By rotating the fitting mount 16, the shafts 15 are rotated integrally with the fitting mount 16 and the protrusion 20a and the round hole 19 are placed out of position, the protrusion 20a pushing the plate spring 18. By further continuing to rotate the fitting mount 16, another protrusion 20b engages the round hole 19, fixing the positions of the shafts 15 and the fitting mount 16.

Figure 11:
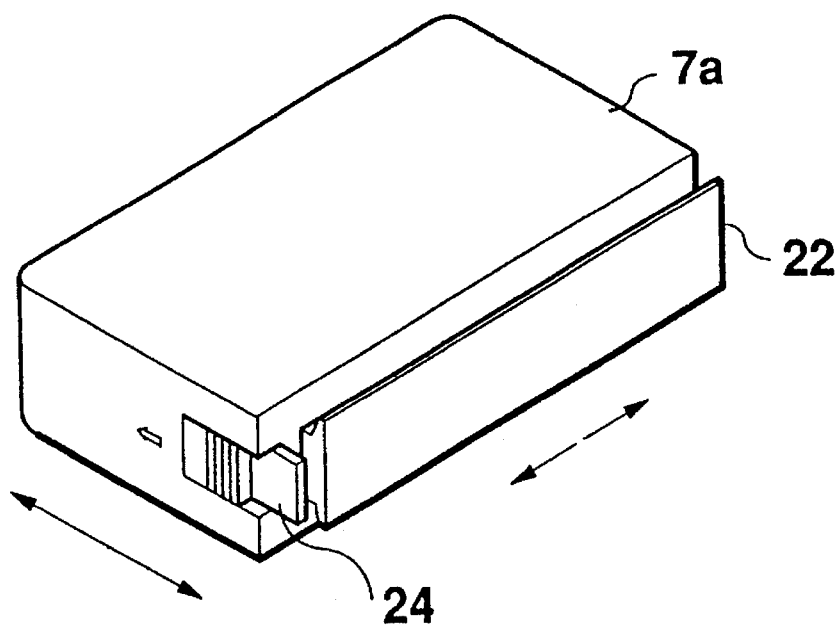
FIG. 11 is a schematic perspective view of the battery pack 7a in FIG. 5.

Next, unloading of the battery pack 7a will be described with reference to FIGS. 7 to 11. The fitting mount 16 is formed with a notch-like hook 21, as shown in FIG. 8. On the other hand, as shown in FIG. 11, the battery pack 7a is formed with a protrusion-like hook 22, which slidably engages the hook 21 for detachably holding both. Also, the battery pack 7a is provided with a slidable lever 24 pushed by a spring 23 shown in FIG. 7. The lever 24 is fitted into a dent 25 made on the fitting mount 16, thereby placing the battery pack 7a in a fixed condition to the main unit 1. On the other hand, to remove the battery pack 7a, the lever 24 may be slid in the longitudinal direction of the radio communication device housing for unlocking it, and the battery pack 7a may be slid in the lateral direction of the radio communication device housing.

Figures 7A, 7B:
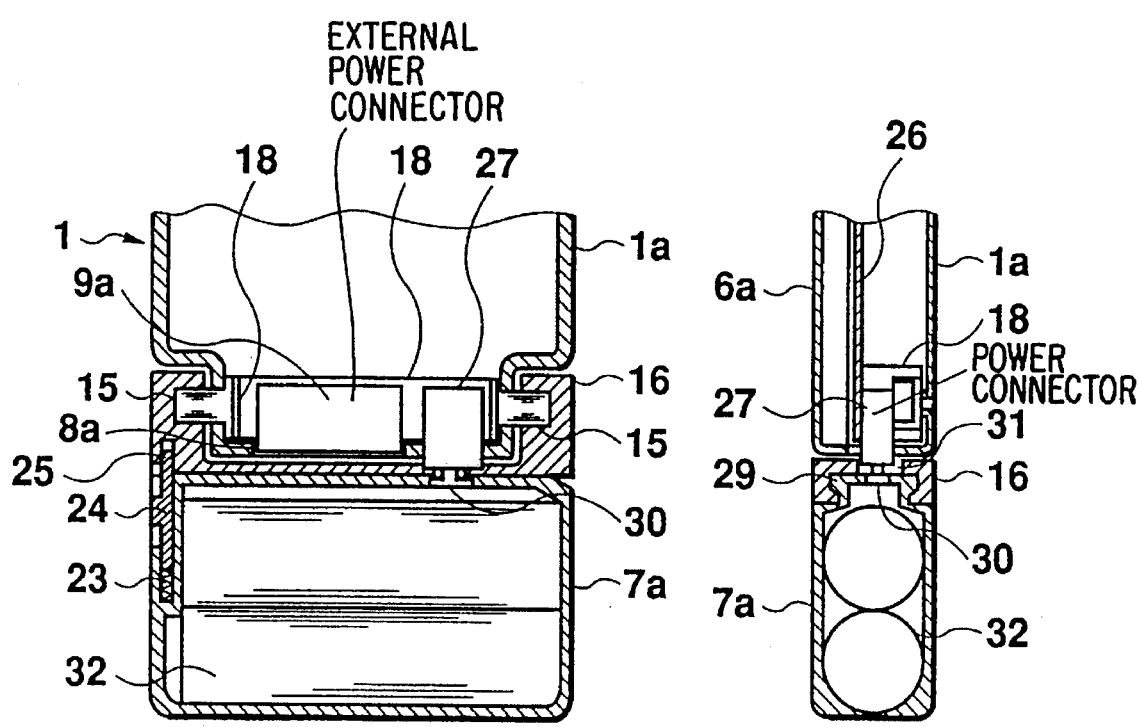
FIG. 7A is a partial sectional view of the portable radio communication device housing for illustrating a fitting portion of a main unit 1 and a battery pack 7a in FIG. 5.
FIG. 7B is a partial sectional side view of the portable radio communication device housing for illustrating the fitting portion of the main unit 1 and battery pack 7a in FIG. 5.
Figure 10:
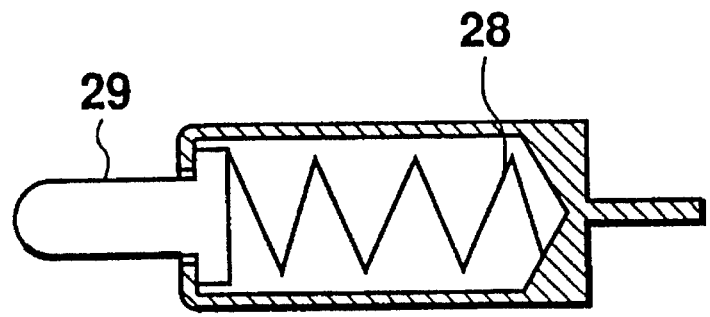
FIG. 10 is a partial sectional view showing a movable terminal 29 in FIG. 7.

Next, the electric connection of the radio communication device main unit 1 and the battery pack 7a will be discussed. A power connector 27 is mounted on a printed board 26 housed in the main unit 1 and equipped with electronic parts, as shown in FIGS. 7A and 7B. The power connector 27 has a movable terminal 29 pushed by a spring 28, as shown in FIG. 29, on the side of the battery pack 7a. When the battery pack 7a is loaded into the radio communication device and is aligned with the radio communication device housing, the movable terminal 29 presses into contact with a fixed terminal 30 installed on the battery pack 7a for conduction of electricity between the housing and the battery pack 7a. A hole 31 is formed in a part of the fitting mount 16 facing the power connector 27.

As shown in FIG. 7B, a battery cell 32 is inserted into the battery pack 7a and the fixed terminal 30 of the battery pack 7a is electrically connected to the battery cell 32.

EMBODIMENT 2

Although in the first embodiment, the shafts 15 are inserted from the inside of the main unit 1 and one plate spring 18 is used to press two shafts 15, shafts 33 may be installed on the fitting mount 16 for insertion from the side of the fitting mount 16, as shown in FIG. 12. In this case, each of the shafts 33 should have a section formed like a partially cut circle as the tip of the shaft 15. The shaft 33 has a groove on the tip. A ring 34 is fitted into the groove for preventing the shaft from slipping off a cover 1a. A claw 36 installed on a spring 35a and two holes 19a and 19b made on the ring 34 function similarly to the dome shaped protrusions 20a formed on the shaft 15 and the hole 19 made on the plate spring 18 in the first embodiment. The spring 35a presses each ring 34 and the claw 36 installed on the spring 35a engages the two holes 19a and 19b made on the ring 34, thereby fixing the rotation position. According to the second embodiment, the shafts 33 can be built in from the outside, thus workability is furthermore improved, compared with the first embodiment, and the spring 35a can be housed compactly in the cover efficiently. Since left positioning and right positioning can be performed separately, the positional relationship between the holes 19a and 19b of the ring 34 and the claw 36 can be adjusted separately at the left and right. Therefore, they can be adjusted accurately.

EMBODIMENT 3

A structure provided by further improving the first and second embodiments will be discussed here. According to the first and second embodiments, when the battery pack 7a is rotated with the shafts 15, 33, it rotates comparatively freely, but may also rotate accidentally. For this reason, a third embodiment has a structure as shown in FIGS. 13A and 13B. A plate spring 37 is disposed between shafts 36 and a fitting mount 16 and an outward force is applied to the shafts 36. Fitted into the opposite side is a rotation stopper 38 shaped like a polygon, such as a hexagon, for preventing the shaft 36 from slipping off. Further, a cover 1a is formed with recessed parts 39 into which the rotation stoppers 38 are fitted. If the shafts 36 are pressed from outside the housing to the inside, as indicated by the arrows in FIG. 13A, for releasing the fitting of the rotation stoppers 38 and the recessed parts 39, the battery pack 7a can be rotated freely. The structure can not only produce effects similar to those in the above-mentioned embodiments, but also prevent the battery pack 7a from rotating accidentally because the battery pack 7a is not rotated unless the shafts 36 are pressed.

EMBODIMENT 4

Another example of the fitting portion of the battery pack 7a and the cover 1a of the main unit shown in the first to third embodiments is given below.

In the above-mentioned embodiments, the shafts 15 must be threaded through with the cover 1a and the fitting mount 16 coupled with each other. In contrast, in a fourth embodiment, a shaft 15 is previously built into a fitting mount 16 via a spring 40, as shown in FIG. 14. Therefore, at the time of assembly, the shaft 15 can be built into the fitting mount 16 while the spring 40 is made to flex, thus improving workability. A spring 35b in FIG. 14B is mounted in the main unit and engages a groove made on the fitting mount 16 for preventing rotation from being placed out of position.

EMBODIMENT 5

Another example of the fixing mechanism of the battery pack 7a and the fitting mount 16 in the first to fourth embodiments will given.

In the embodiments, the battery pack 7a and the fitting mount 16 are fixed by means of the lever 24 and the spring 23. On the other hand, in a fifth embodiment, a lever 24b is integrated with a battery pack 7a, as shown in FIG. 15. The lever 24b is formed by providing a gap between the face of the battery pack 7a opposed to a fitting mount 16 and a battery cell 32 storage section. The lever 24b is depressed in the arrow direction in FIG. 15 by utilizing the elasticity of the lever 24b, thereby releasing the fixed condition of the fitting mount 16 and enabling the battery pack 7b to be removed from the fitting mount 16. The number of parts can be reduced by integrating the lever 24b with the battery pack 7a in such a manner.

EMBODIMENT 6

Next, a modified embodiment of the fitting portion of the battery pack 7a and the fitting mount 16 shown in the first to fifth embodiments will be discussed.

In the embodiments, the battery pack 7a is fitted into the fitting mount 16 by the sliding method. In contrast, a sixth embodiment is characterized by the fact that a battery pack 7a is fitted to a fitting mount 16 for rotation.

A hook 21b used as an axis of rotation is formed in a part of the face of the fitting mount 16 opposed to the battery pack 7a. A rotation stopper 22b capable of regulating rotation is located in the part of the battery pack 7a corresponding to the hook 21b.

To use battery cells 32 as a power supply, a lever 24c integrated with the battery pack 7a is fitted into a dent 25b provided on the fitting mount 16 for fixing the battery pack 7a to the fitting mount 16. A movable terminal 29 of a power connector 27 installed on the fitting mount 16 comes into contact with a fixed terminal 30 installed on the battery pack 7a, whereby the battery cells 32 are electrically connected to the power connector 27 via the fixed terminal 30 and the movable terminal 29 for supplying power to the main unit of the radio communication device.

The fixed terminal 30 coming into contact with the movable terminal 29 of the power connector 27 is located in a protrusion 30a formed so as to protrude from the face of the battery pack 7a opposite the fitting mount 16. In the sixth embodiment, the battery pack 7a is rotatably fitted to the fitting mount 16, thus the protrusion 30a does not become an obstacle when the battery pack 7a is fixed to the fitting mount 16.

Therefore, the protrusion dimension of the movable terminal 29 from the fitting mount 19 can be reduced, enabling protection of the movable terminal 29.

EMBODIMENT 7

Figures 17A, 17B:
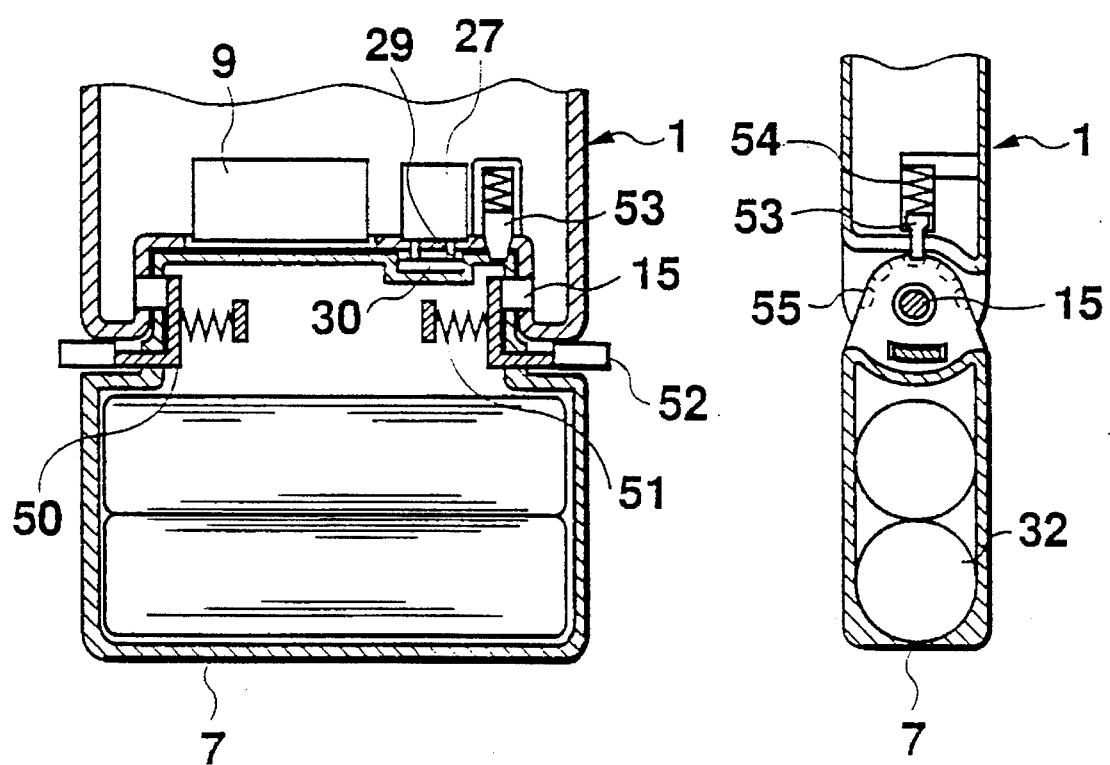
FIG. 17A is a partial sectional view illustrating a rotation mechanism in a fitting portion of a portable radio communication device housing and a battery storage unit according to a seventh embodiment of the invention.
FIG. 17B is a partial sectional side view illustrating the rotation mechanism in the fitting portion of the portable radio communication device housing and battery storage unit according to the seventh embodiment of the invention.
Figure 18:
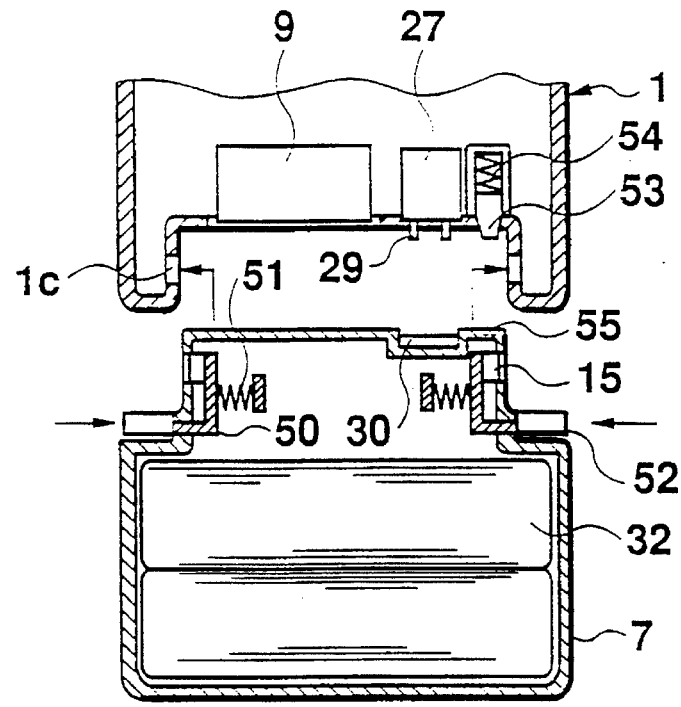
FIG. 18 is a partial sectional view illustrating a mechanism for fitting the battery storage unit into the portable radio communication device housing according to the seventh embodiment of the invention.

In the first to sixth embodiments, the fitting mount 16 of the battery pack 7a is fitted to the radio communication device housing via the rotating shafts 15. However, as shown in FIGS. 17A, 17B, and 18, shafts 15 may be installed directly in a battery storage unit 7 without providing the fitting mount, as described below:

FIGS. 17 and 18, a case la is formed with shaft holes 1c that the shafts 15 engage. The battery storage unit 7 is provided with L-shaped metal fixtures 50 integrated with the shafts 15 and shaft springs 51. A knob 52 is pressed into the tip of each L-shaped metal fixture. Further, the case 1a is formed with a positioning pin 53 and a positioning spring 54 for positioning the case 1a and the battery storage unit 7 when the battery storage unit 7 is fitted into the case 1a. On the other hand, the battery storage unit 7 is formed with positioning recesses 55 at positions corresponding to the positioning pin 53.

Next, the operation will be described. As shown in FIG. 18, when the knobs 52 provided on both sides of the battery storage unit 7 are pushed inwards, the L-shaped metal fixtures 50, each having one end attached to the knob 52, also slide inwards in association with the knobs 52. The shafts 15, with each of which another end of each L-shaped metal fixture 50 is integrated, are located at the positions corresponding to the shaft holes 1c made on the case 1a. When the knobs 52 are pushed inwards, the shafts 15 are dented slightly inwardly from the case surface of the battery storage unit 7.

If, with the knobs 52 pushed inwards, the battery storage unit 7 is moved to the position of fitting it into the radio communication device housing and then the knobs 52 are released, the L-shaped metal fixtures 50 are pushed outward by a force of the shaft springs 51 and the shafts 15 move outwardly accordingly, whereby the shafts 15 engage the shaft holes 1c. On the other hand, the positioning spring 54 continuously applies a force to the positioning pin 53 in the direction in which the positioning pin 53 springs out downwardly, namely, to the side of the battery storage unit 7. When the battery storage unit 7 is fitted into tile case 1a, a plurality of positioning recesses 55 are provided at the positions corresponding to the positioning pin 53. When the battery storage unit 7 is rotated, the positioning pin 53 is held at the positions of the positioning recesses 55. Therefore, the battery storage unit 7 can be held at a predetermined positioning angle with the case 1a. Thus, the shafts are provided in the battery storage unit without installing the fitting mount, thereby making the part of the fitting mount unnecessary, namely, reducing the number of parts and enabling the provision of an inexpensive apparatus.

EMBODIMENT 8

Figure 19:
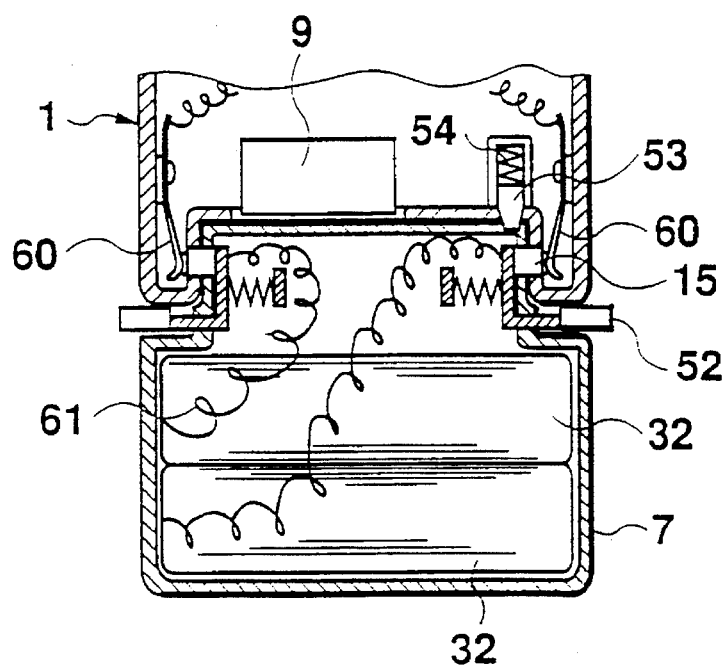
FIG. 19 is a partial sectional view illustrating a rotation mechanism in a fitting portion of a portable radio communication device housing and a battery storage unit according to an eighth embodiment of the invention.

Although an example in which the shafts 15 are installed in the battery storage unit 7 is given as the seventh embodiment, shafts 15 may also be used as power supply terminals, as shown in FIG. 19. In a battery pack 7a, positive and negative terminals of battery cells 32 are connected to shafts 15 on both sides of the battery pack 7a by connection lines 61. The shafts 15 serve as positive and negative power supply terminals of a battery storage unit 7.

On the other hand, power supply terminals 60 are located in shaft engagement parts in a radio communication device housing 1. Therefore, if the battery storage unit 7 is fitted into the radio communication device main unit 1 and the shafts 15 engage the power supply terminals 60 via shaft holes 1c as shown in FIG. 18, the shafts 15, namely, the battery cells 32, and the power supply terminals 60 are electrically connected.

Thus, if the battery pack is rotated at various angles, the power supply terminals can always be connected to the battery cells 32.

As described above, according to the invention, the battery storage unit is rotatably attached to the main unit of the portable radio communication device. When the battery storage unit is positioned at a predetermined battery connection position to the main unit of the portable radio communication device, the battery power connector section comes into contact with the fixed terminal of the battery storage unit. On the other hand, the external power connector section can be exposed for connection to an external power supply by rotating the battery storage unit a predetermined amount from the battery connection position to the main unit of the portable radio communication device.

Therefore, the portable radio communication device can be formed as thin as the thickness of the battery storage unit, which is limited to the battery size. On the other hand, to use an external power supply, the external power connector section can be exposed if the battery storage unit is rotated. Thus, the extremely simple structure enables the user to select the battery power or external power supply for appropriate use.

Each shaft functioning as a rotating shaft is formed with protrusions and the plate spring energizing the shafts is formed with a hole on both ends that the protrusion engages. As the protrusions engage the holes, the position in the rotation direction of the fitting mount with respect to the main unit of the portable radio communication device can be determined easily and automatically according to the simple structure.

Further, the fitting mount section is provided with shafts fitted into the main unit of the portable radio communication device. Therefore, the apparatus can be assembled by fitting the shafts from the housing outside of the main unit of the portable radio communication device, so that easy assembly and high workability are accomplished. The simple structure enables setting of the position in the rotation direction of the fitting mount.

Shaft rotation stoppers formed as polygons are fitted to the ends of the shafts on the housing inside of the portable radio communication device main unit. Receptacles each engaging each of the shaft rotation stoppers, are provided within the housing. The shaft rotation stoppers formed as polygons can prevent accidental rotation of the fitting mount because the fitting mount does not rotate unless the shaft rotation stoppers are removed from the recesses, whereby damage to the machine, etc., can be reduced.

The battery pack section is rotatably fitted to the fitting mount section, and a protrusion provided with a fixed terminal is formed on the fitting mount section side of the battery pack section. When the battery pack section is fixed to the fitting mount section, the fixed terminal comes into contact with the battery power connector section. Therefore, the protrusion dimension of the battery power connector section from the portable radio communication device main unit can be decreased and failure in the battery power connector section can be reduced.

If the shafts are attached to the fitting mount section via springs and are fitted from the fitting mount section to the inside of the portable radio communication device main unit, the shafts for the fitting mount section are elastic, facilitating fitting of the fitting mount to the portable radio communication device main unit.

The battery storage unit itself can be detachably attached to the portable radio communication device main unit, whereby the number of parts of the apparatus can be reduced drastically.

Further, by electrically connecting the shafts to the battery, the shafts can be made to serve as the rotating shafts and battery power connector. This eliminates the need for providing any additional battery power connector, enabling further reduction of the number of parts of the apparatus.

What is claimed is:

1. A portable radio communication device having a portable radio communication device main unit comprising electronic equipment housed in a housing thereof and a battery storage unit fitted to said portable radio communication device main unit for supplying power thereto, said battery storage unit being rotatably fitted to said portable radio communication device main unit, said portable radio communication main unit comprising:

a battery power connector section for receiving a power supply from a battery and an external power connector section for receiving a power supply from an external power source, located on a battery storage unit side of said main unit, when said battery storage unit is positioned at a predetermined battery connection position to said portable radio communication device main unit, said battery power connector section comes into contact with a fixed terminal of said battery storage unit, said battery storage unit being rotatable by a predetermined amount from the battery connection position to expose said external power connector section for connection of said external power source to said portable radio communication device main unit through said external power connector section.

2. The portable radio communication device as claimed in claim 1 wherein said battery storage unit has:

a fitting mount section being rotatably fitted to said portable radio communication device main unit, and a battery pack section being detachably fitted to said fitting mount section.

3. The portable radio communication device as claimed in claim 2 wherein the housing of said portable radio communication device main unit contains:

shafts functioning as rotating shafts and a plate spring for energizing said shafts from inside of said housing to outside, said shafts being fitted into said fitting mount for rotating together with said fitting mount, wherein a frictional contact portion of at least one of said shafts with said plate spring is formed substantially like a disk and a predetermined number of dome shaped protrusions are formed on a surface of said frictional contact portion, said plate spring having a hole on at least one side for engaging one of said dome shaped protrusions formed on said shafts, and wherein a position in a rotation direction of said fitting mount section with respect to said portable radio communication device main unit is determined by engaging one of the dome shaped protrusions of each of said shafts into each hole of said plate spring.

4. The portable radio communication device as claimed in claim 2 wherein said fitting mount section is formed with said shafts being fitted into said portable radio communication device main unit for rotating together with said fitting mount section, wherein a shaft slipping off prevention plate formed with a plurality of holes is fitted to an end of said shaft on the housing inside of said portable radio communication device main unit, wherein a spring having a claw engaging one of the holes formed on said shaft slipping off prevention plate is fixed inside said housing of said portable radio communication device main unit, and wherein a position in a rotation direction of said fitting mount section with respect to said portable radio communication device main unit is determined by engaging said claw of said spring into one of said holes of said shaft slipping off prevention plate.

5. The portable radio communication device as claimed in claim 2 wherein said fitting mount section is formed with said shafts being fitted into said portable radio communication device main unit for rotating together with said fitting mount section, wherein a shaft rotation stopper formed as a polygon is fitted to an end of said shaft on the housing inside of said portable radio communication device main unit, and wherein receptacles each engaging each of said shaft rotation stoppers are provided within said housing for regulating rotation of said shaft rotation stoppers.

6. The portable radio communication device as claimed in claim 2 wherein said battery pack section is provided with a lever for fixing a position, said lever being fitted into a recess formed in said fitting mount section for fixing said battery pack section to said fitting mount section.

7. The portable radio communication device as claimed in claim 6 wherein said battery pack section is rotatably fitted to said fitting mount section, and wherein a protrusion is formed on the fitting mount section side of said battery pack section, said protrusion being formed with a fixed terminal, said fixed terminal coming into contact with said battery power connector section when said battery pack section is fixed to said fitting mount section.

8. The portable radio communication device as claimed in claim 2 wherein each of said shafts is attached to said fitting mount section via a spring and is fitted from said fitting mount section to the inside of said portable radio communication device main unit.

9. The portable radio communication device as claimed in claim 1 wherein said portable radio communication device main unit comprises an elastic positioning terminal located on the battery storage unit side of said main unit, and wherein a plurality of positioning recesses engaging said positioning terminal are formed in a portion of said battery storage unit facing said positioning terminal.

10. The portable radio communication device as claimed in claim 9 wherein said battery storage unit is provided with said shafts fitted into said portable radio communication device main unit for rotating together with said battery storage unit, L-shaped members, and protrusions for moving said L-shaped members in a rotating shaft direction, said shafts each being attached to one end of each of said L-shaped members, said protrusions formed so as to protrude from the housing of said battery storage unit each being attached to another end of each of said L-shaped letter members, and wherein a fitting state of said shafts and said portable radio communication device main unit is released by handling said protrusions for moving said L-shaped members in the rotating shaft direction.

11. A portable radio communication device having a portable radio communication device main unit comprising electronic equipment housed in a housing thereof and a battery storage unit fitted to said portable radio communication device main unit for supplying battery power thereto, said battery storage unit being fitted to said portable radio communication device main unit for rotation with shafts as rotating shafts, said portable radio communication device main unit comprising:

an external power connector section for receiving a power supply from an external power source, located on a battery storage unit side of said main unit; and battery power terminals coming into contact with said shafts when said shafts of said battery storage unit are fitted into said main unit, said battery storage unit being rotatable with respect to said portable radio communication device main unit to expose said external power connector section for connection of said external power source through said external power connector section, said battery storage unit being provided with:

the shafts electrically connected to the battery and fitted into said portable radio communication device main unit;

L-shaped members each having one end attached to each of said shafts; and protrusions each being attached to another end of each of said L-shaped members for moving said L-shaped members in a rotating shaft direction, said portable radio communication device main unit being electrically connected to said battery via said battery power terminals and said shafts by fitting said shafts into said portable radio communication device main unit, a fitting state of said shafts and said portable radio communication device main unit and the electrical connection of said portable radio communication device main unit to said battery being released by handling said protrusions for moving said L-shaped members in the rotating shaft direction.

* * * * *